United States Patent
Toyohara et al.

[19]

[11] Patent Number: 6,064,503
[45] Date of Patent: May 16, 2000

[54] LIGHT SOURCE FOR WAVELENGTH DIVISION MULTIPLEXING COMMUNICATIONS

[75] Inventors: Atsushi Toyohara; Katsushi Akahori, both of Tokyo, Japan

[73] Assignee: NEC Corporation, Tokyo, Japan

[21] Appl. No.: 09/030,848

[22] Filed: Feb. 26, 1998

[30] Foreign Application Priority Data

Feb. 27, 1997 [JP] Japan ..................................... 9-044144

[51] Int. Cl.[7] .................................................. H04B 10/00
[52] U.S. Cl. .......................... 359/161; 359/124; 359/183; 359/188
[58] Field of Search ................................... 359/132, 130, 359/180, 161, 188

[56] References Cited

U.S. PATENT DOCUMENTS 5,157,744  10/1992  Korotky ....................................... 385/2
5,717,510   2/1998  Ishikawa et al. ......................... 359/161

*Primary Examiner*—Jason Chan
*Assistant Examiner*—Hanh Phan
*Attorney, Agent, or Firm*—Whitham, Curtis & Whitham

[57] ABSTRACT

Disclosed is a light source for wavelength division multiplexing communications which has: a unit for outputting light with a wavelength band having a constant width; a unit for dividing the light into first dividied light and second divided light; at least one selective wavelength blocking unit which blocks selectively light with a specific wavelength of the first divided light to output light that the light with a specific wavelength is removed; a unit for conducting such a phase control that the phase difference between the selectively-wevelength-blocked light and the second divided light is 180° to each other and for outputting first phase-controlled light and second phase-controlled light; and a coupling for coupling the first phase-controlled light and the second phase-controlled light to output coupled light.

52 Claims, 10 Drawing Sheets

LIGHT SOURCE FOR WAVELENGTH DIVISION MULTIPLEXING COMMUNICATIONS

FIELD OF THE INVENTION

This invention relates to a light source used in wavelength division multiplexing communications.

BACKGROUND OF THE INVENTION

Wavelength division multiplexing technologies, where multiple wavelengths are simultaneously transmitted for achieving high-speed and large-capacity communications, have rapidly developed with the progress in optical communication technology.

In the construction or experiment of a wavelength division multiplexing transmission system, multiple light sources with different wavelengths are necessary corresponding to the number of transmission channels. In general, wavelength selection in wavelength division multiplexing transmission cannot be freely conducted since there are some limitations such as to avoid a combination of wavelengths troubling the transmission, e.g., mixing of four light waves. Namely, an arbitrariness, accuracy and sureness in wavelength selection are desired. In general, such a light source is difficult to fabricate and is costly due to the lowered production yield. Further, one light source is needed for one wavelength, thus, in case of eight-channel wavelength division multiplexing transmission, eight light sources are necessary.

On the other hand, when lights from multiple light sources are transmitted through one transmission line, a wavelength division multiplexing device called coupler or multiplexer is necessary. As the wavelength division multiplexing device, for example, a N×1 coupler of fiber fusion type, a N×1 coupler of waveguide type, or AWG (arrayed waveguide grating) is used. In case of eight channels, for example, the insertion loss for a 8×1 coupler is about 10 to 12 dB and that for AWG is about 6 to 9 dB. Thus, the insertion loss in coupling is so big.

In order to provide arbitrarily different light source wavelengths, it is necessary to fabricate separately laser diodes (LDs) for light source corresponding to the necessary wavelengths. Therefore, the manufacturing cost must be increased. Further, the production yield is lowered due to the accuracy and sureness needed for providing desired wavelengths. Also, the insertion loss in coupling must be so big.

For example, in a conventional N×1 coupler composed of several 2×1 couplers, a 2×1 coupler theoretically causes an insertion loss of 3 dB at minimum. Namely, a 8×1 coupler causes an insertion loss of 9 dB theoretically. In fact, there occurs an insertion loss of about 10 to 12 dB.

Meanwhile, the insertion loss can be reduced by using a wavelength coupler called AWG. For example, in case of AWG with eight channels, the insertion loss is about 6 to 9 dB, which is smaller than that of the 8×1 coupler. However, the insertion loss in coupling is still big.

SUMMARY OF THE INVENTION

Accordingly, it is an object of the invention to provide a light source for wavelength division multiplexing communications where the insertion loss in coupling can be reduced.

It is a further object of the invention to provide a light source for wavelength division multiplexing communications where an arbitrariness, accuracy and sureness in wavelength selection can be achieved with a reduced cost.

According to the invention, a light source for wavelength division multiplexing communications, comprises:

means for outputting light with a wavelength band having a constant width;

means for dividing the light into first divided light and second divided light;

at least one selective wavelength blocking means which blocks selectively light with a specific wavelength of the first divided light to output light that the light with a specific wavelength is removed;

means for conducting such a phase control that the phase difference between the selectively-wavelength-blocked light and the second divided light is 180° to each other and for outputting first phase-controlled light and second phase-controlled light; and means for coupling the first phase-controlled light and the second phase-controlled light to output coupled light.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a light source for wavelength division multiplexing communications in the preferred embodiments, the aforementioned conventional light sources will be explained in FIGS. 1 and 2.

Figure 1:
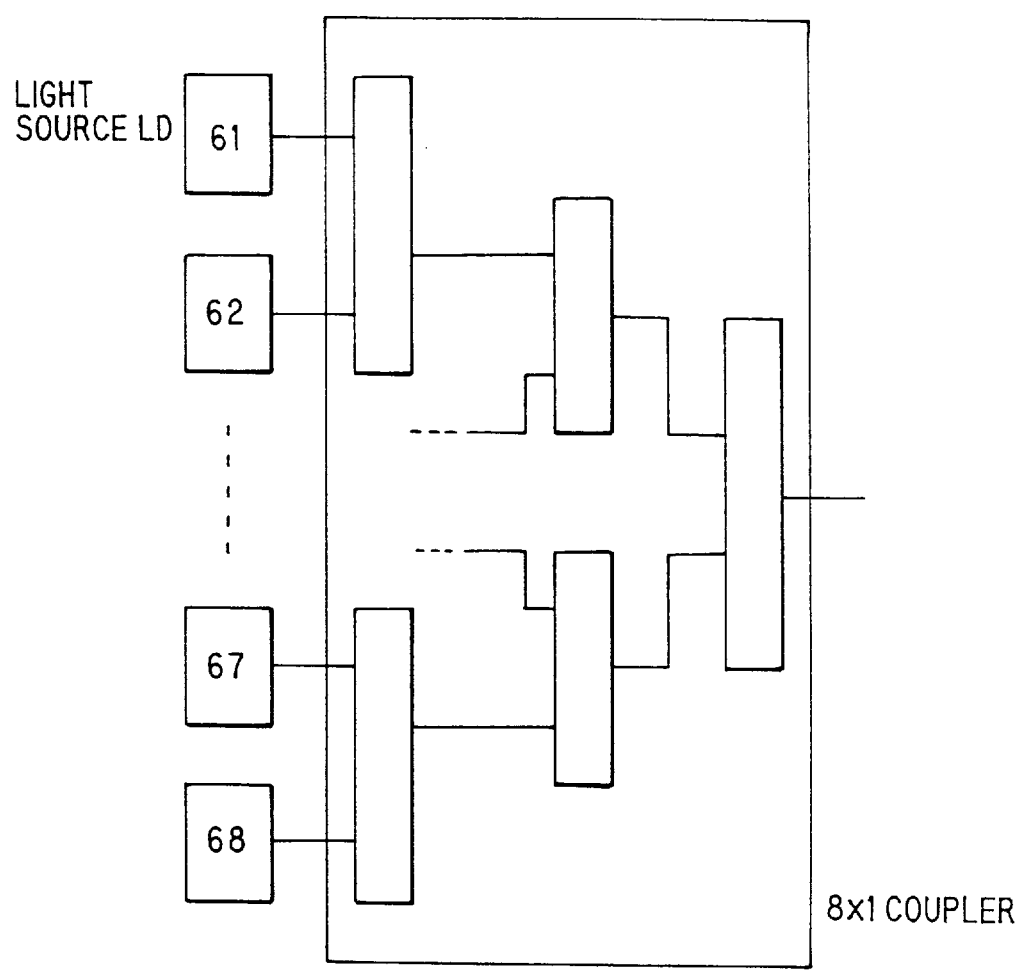
FIG. 1 is a block diagram showing a first conventional light source for wavelength division multiplexing communications.
Figure 2:
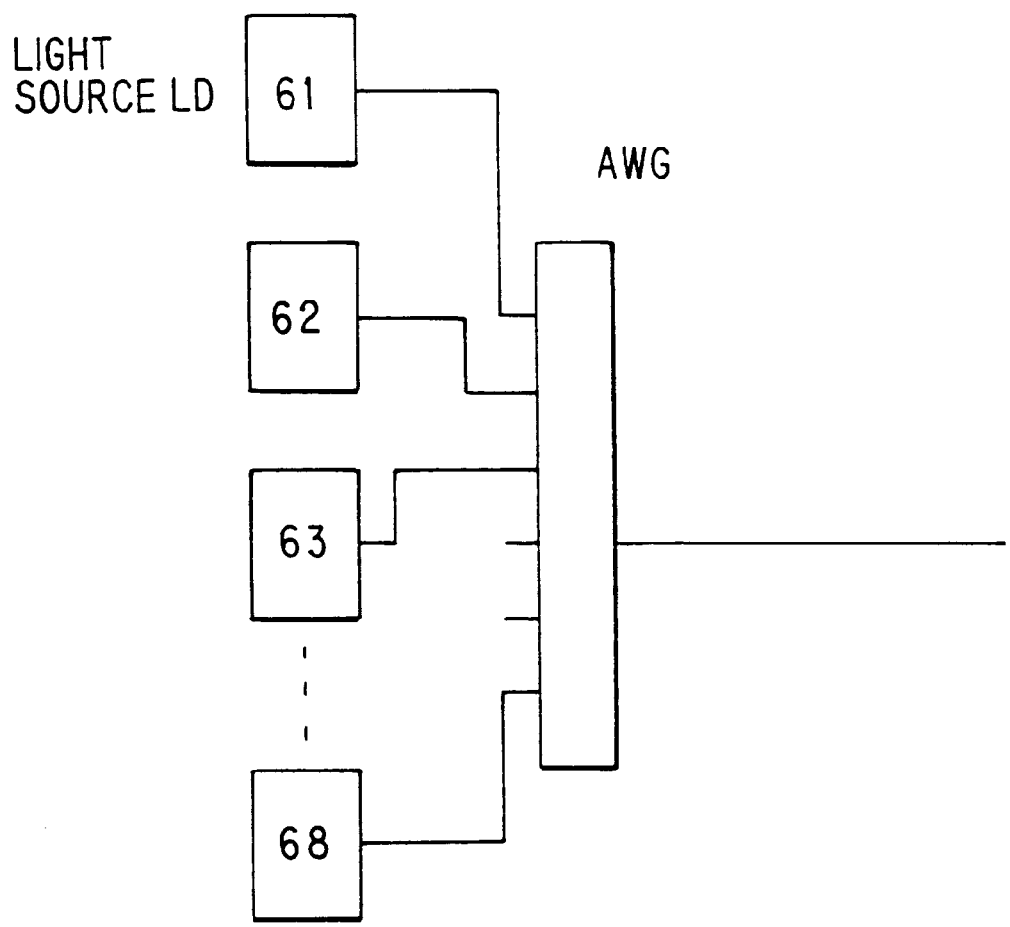
FIG. 2 is a block diagram showing a second conventional light source for wavelength division multiplexing communications.

FIG. 1 shows the conventional light source with a 8×1 coupler. Lights output from eight light-source LDs (laser diodes) 61 to 68 are coupled into four lights at the first stage of the 8×1 coupler, and then the four lights are coupled into two lights at the second stage of the 8×1 coupler, and then the two lights are coupled into single light, i.e., the eight lights are finally multiplexed. FIG. 2 shows the conventional light source with AWG (arrayed waveguide grating). Lights output from eight light-source LDs (laser diodes) 61 to 68 are coupled into single light, i.e., the eight lights are directly multiplexed.

Next, the operation principle of a light source for wavelength division multiplexing communications of the invention will be explained below.

In the light source for wavelength division multiplexing communications of the invention, light with a constant width and relatively broad wavelength band is output from a light source, and then the light is divided into two lights. One light is kept unaltered, and the other light is processed by blocking specific light with a narrow band wavelength to be used as the light source wavelength. Then, the divided lights are phase-controlled to have a phase difference of $\pi$ (180°) to each other, and then are optically coupled to conduct the differential amplification. As a result, neither of the divided lights is output and only the blocked specific light is output as it is.

In this case, by disposing a plurality of selective wavelength blocking means for blocking specific wavelength lights in series and setting the wavelengths of the blocked lights to be different from each other, the blocked lights can be output as lights for wavelength division multiplexing after the optical coupling.

The light source to output light with the relatively broad and constant wavelength band may be an optical fiber amplifier to output amplified spontaneous emission (ASE) light. Specifically, an optical fiber with a core doped with a rare earth element, e.g., an erbium-doped fiber (hereinafter also referred to as 'EDF') that erbium is doped into the core part of a quartz-system optical fiber, may be used. When light power with a specific wavelength, e.g., 1.48 $\mu$m band or 0.98 $\mu$m band, is input to EDF, amplified spontaneous emission (ASE) light with a wavelength band from 1.53 $\mu$m band to 1.56 $\mu$m band can be output.

Meanwhile, the selective wavelength blocking means for blocking specific wavelength lights may be dielectric multilayer film, optical waveguide, fiber grating etc.

Figure 8A:
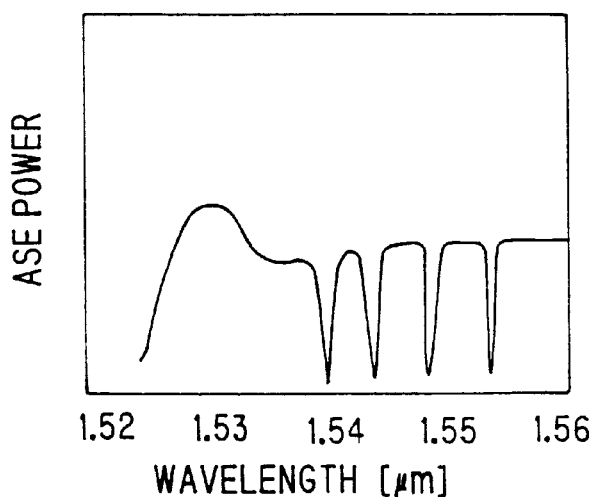
FIG. 8A is a graph showing a spectrum after passing band-pass filters.
Figure 8B:
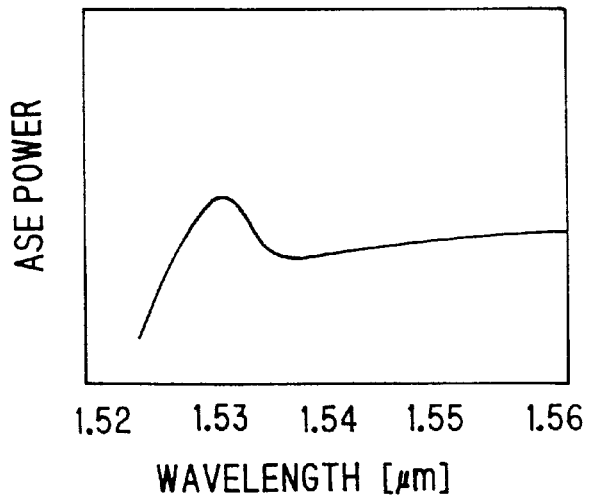
FIG. 8B is a graph showing a spectrum after optically dividing.
Figure 8C:
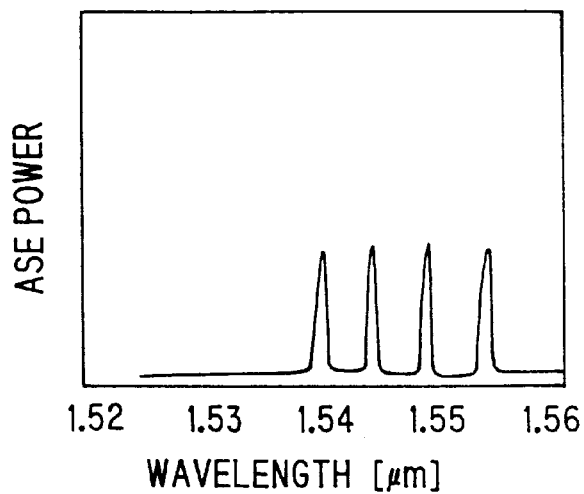
FIG. 8C is a graph showing a spectrum after phase-changing and optically coupling.

Now, taken is an example that four wavelength filters (band-pass filters) with different blocking wavelengths are inserted into path B corresponding to the other light described above. FIGS. 8A to 8C show spectra output at several parts in this composition. FIG. 8A shows a light spectrum after passing the band-pass filters, and FIG. 8B shows a light spectrum after the optical dividing on path A corresponding to one light described above. Both the output lights are controlled to have a phase difference of $\pi$ (180°) to each other, and then are optically coupled. Thereby, after the coupling, a light spectrum shown in FIG. 8C can be obtained. Thus, the light output differentially amplified can be obtained.

Next, light sources for wavelength division multiplexing communications in the first to sixth preferred embodiments will be explained in FIGS. 3 to 7 and 9.

Figure 3:
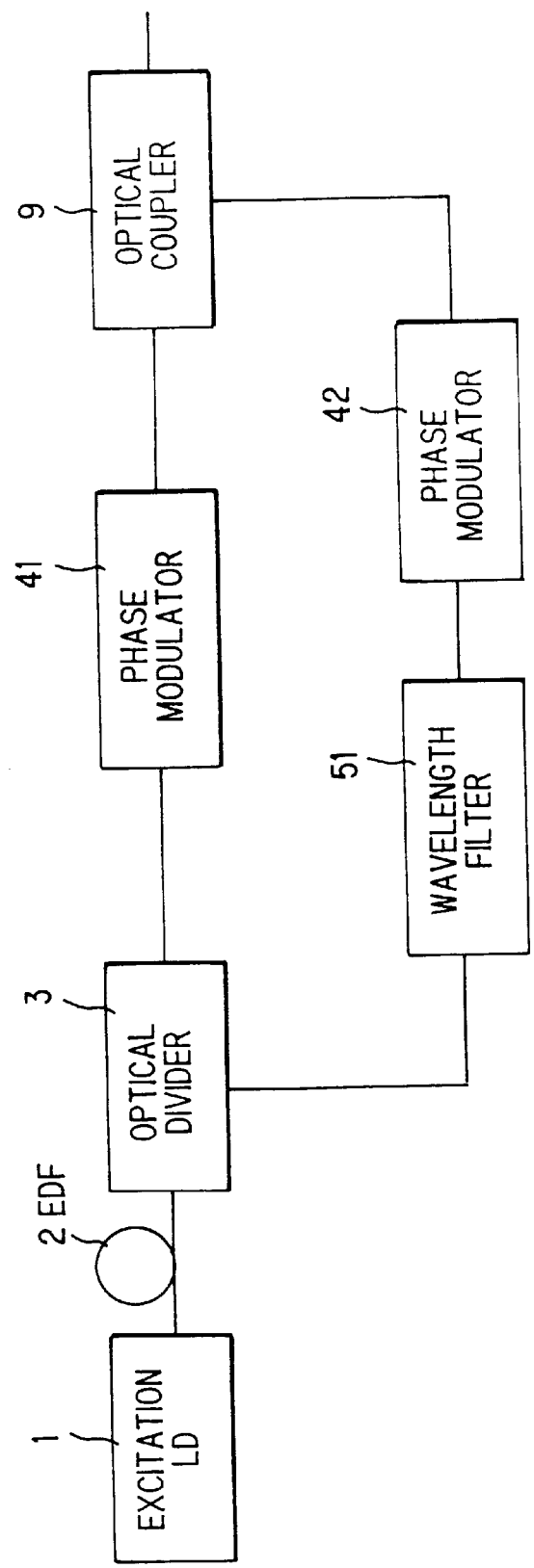
FIG. 3 is a block diagram showing a light source for wavelength division multiplexing communications in a first preferred embodiment according to the invention.

In the first embodiment having a basic composition, as shown in FIG. 3, an excitation laser diode (LD) 1 is connected to one end of an erbium-doped fiber (HDF) 2. Thereby, from the other end of the erbium-doped fiber (EDF) 2, amplified spontaneous emission (ASE) light is output.

The amplified spontaneous emission (ASE) light obtained has the same profile as that in FIG. 8B. As show in FIG. 3, the amplified spontaneous emission (ASE) light is divided into two lights by an optical divider 3, and one of the two lights is input to a phase modulator 41 and the other is transmitted through a wavelength filter 51 and then is input to a phase modulator 42.

The wavelength filter 51 has a characteristic of blocking only a specific wavelength. The output spectra of the phase modulators 41, 42 are different from each other only as to the wavelength characteristic of the wavelength filter 51, and the phase difference between the phase modulators 41, 42 is controlled to be $\pi$ (180°) by the phase modulators 41, 42. Then, the divided lights that are controlled to have the phase difference of $\pi$ to each other are coupled by an optical coupler 9, and then the difference of their spectra is output from the optical coupler 9.

Figure 4:
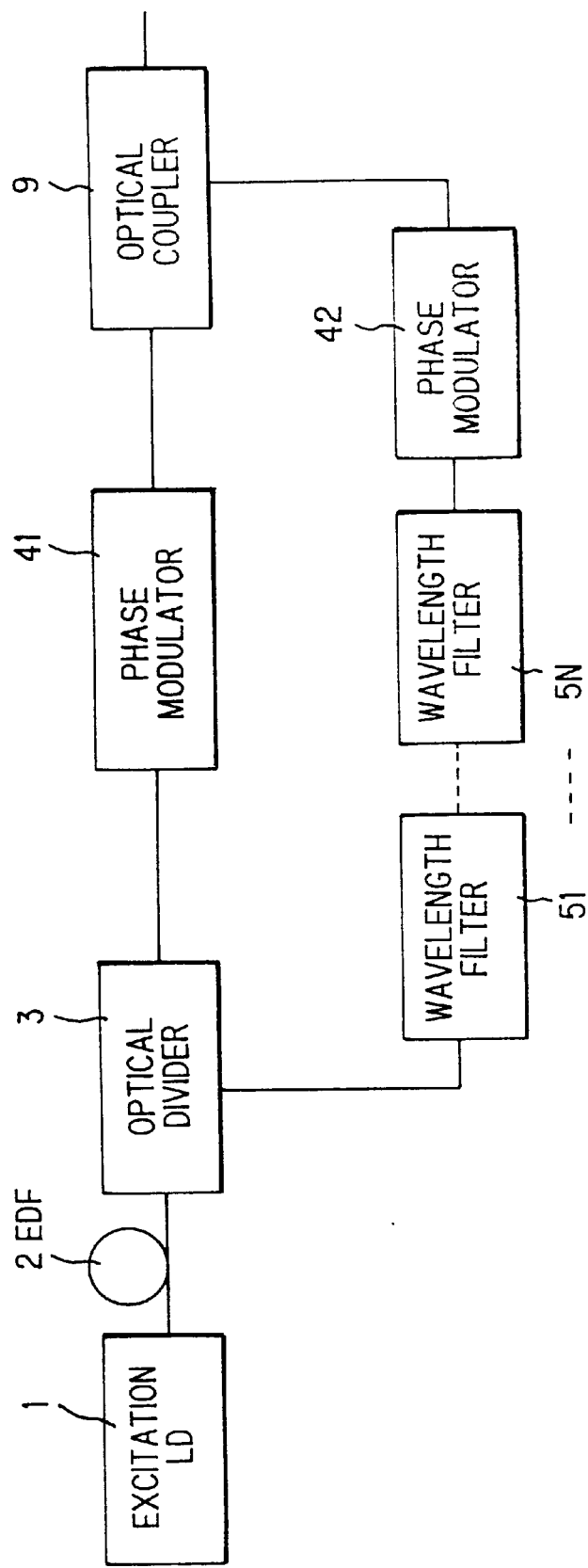
FIG. 4 is a block diagram showing a light source for wavelength division multiplexing communications in a second preferred embodiment according to the invention.

A light source for wavelength division multiplexing communications in the second preferred embodiment will be explained in FIG. 4. The second embodiment, which is a modification of the first embodiment, is characterized in that there are disposed a plurality of wavelength filters 51 to 5N. Therefore, it can obtain a plurality of wavelength lights.

Figure 5:
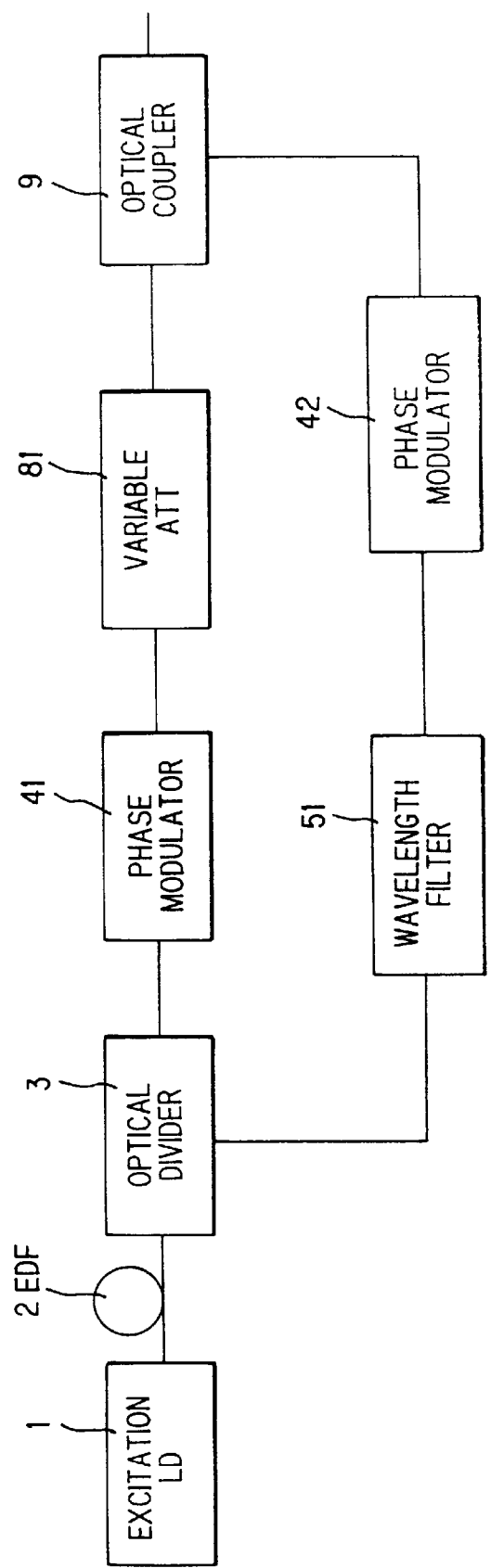
FIG. 5 is a block diagram showing a light source for wavelength division multiplexing communications in a third preferred embodiment according to the invention.
Figure 6:
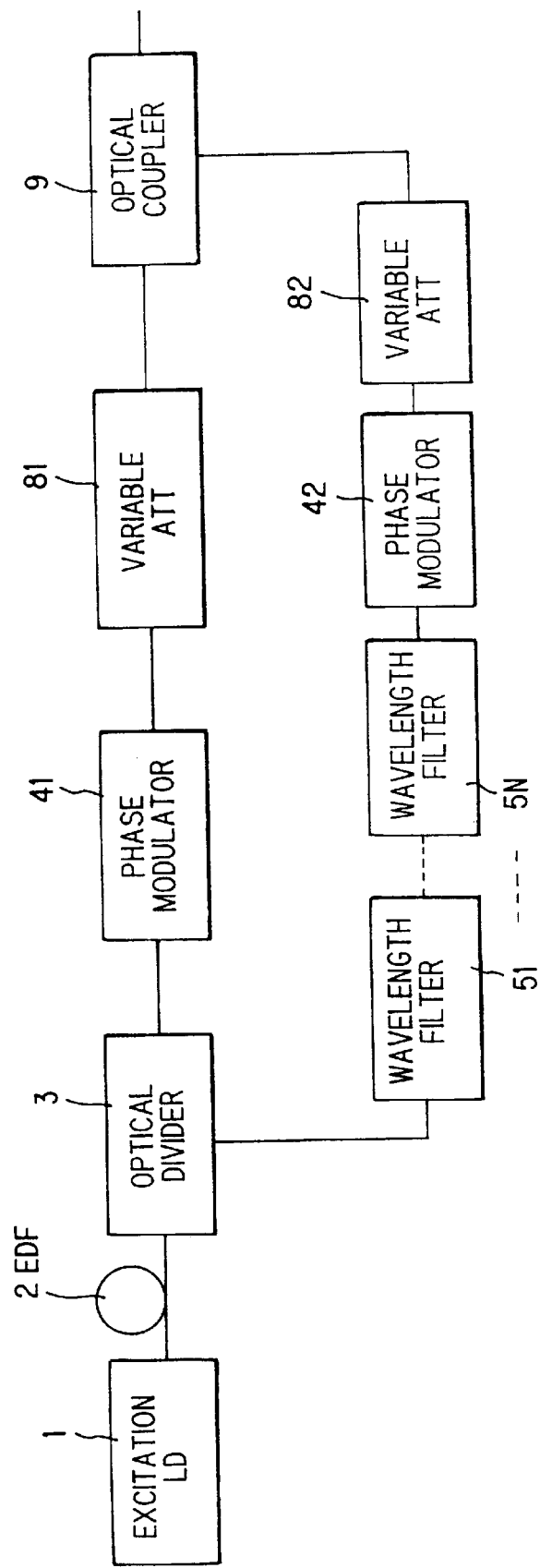
FIG. 6 is a block diagram showing a light source for wavelength division multiplexing communications in a fourth preferred embodiment according to the invention.

Light sources for wavelength division multiplexing communications in the third and fourth preferred embodiments will be explained in FIGS. 5 and 6. The third and fourth embodiments, which are modifications of the first and second embodiments, are characterized in that there are disposed variable light attenuators (ATT) 81 and/or 82 after the phase modulator. Thereby, a dispersion or insertion loss in the optical divider 3 or phase modulator 41, 42 can be corrected. Therefore, light other than specific wavelength light to be used for the optical communications can be eliminated from the output light.

Figure 7:
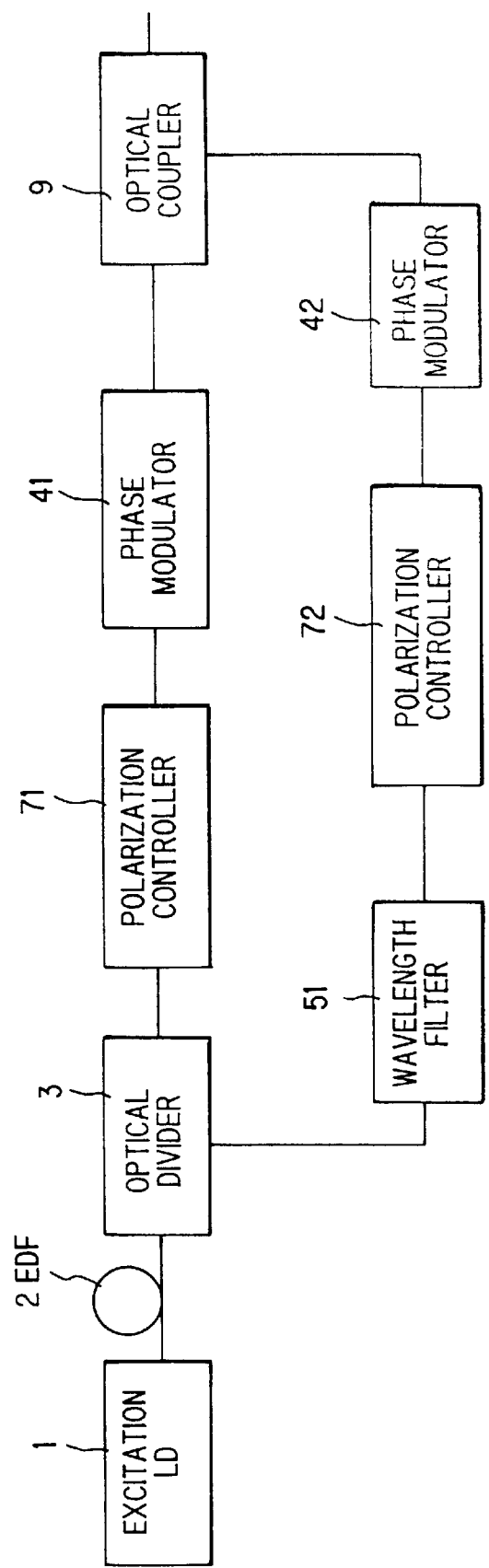
FIG. 7 is a block diagram showing a light source for wavelength division multiplexing communications in a fifth preferred embodiment according to the invention.

A light source for wavelength division multiplexing communications in the fifth preferred embodiment will be explained in FIG. 7. The fifth embodiment is characterized in that there are provided polarization controllers 71, 72, which function to control polarized wave input to the phase modulators 41, 42, before the phase modulators 41, 42. Thereby, the change of polarized wave that may occur on the transmission line can be corrected. Therefore, the operation of the phase modulators can be further stabilized.

Figure 9:
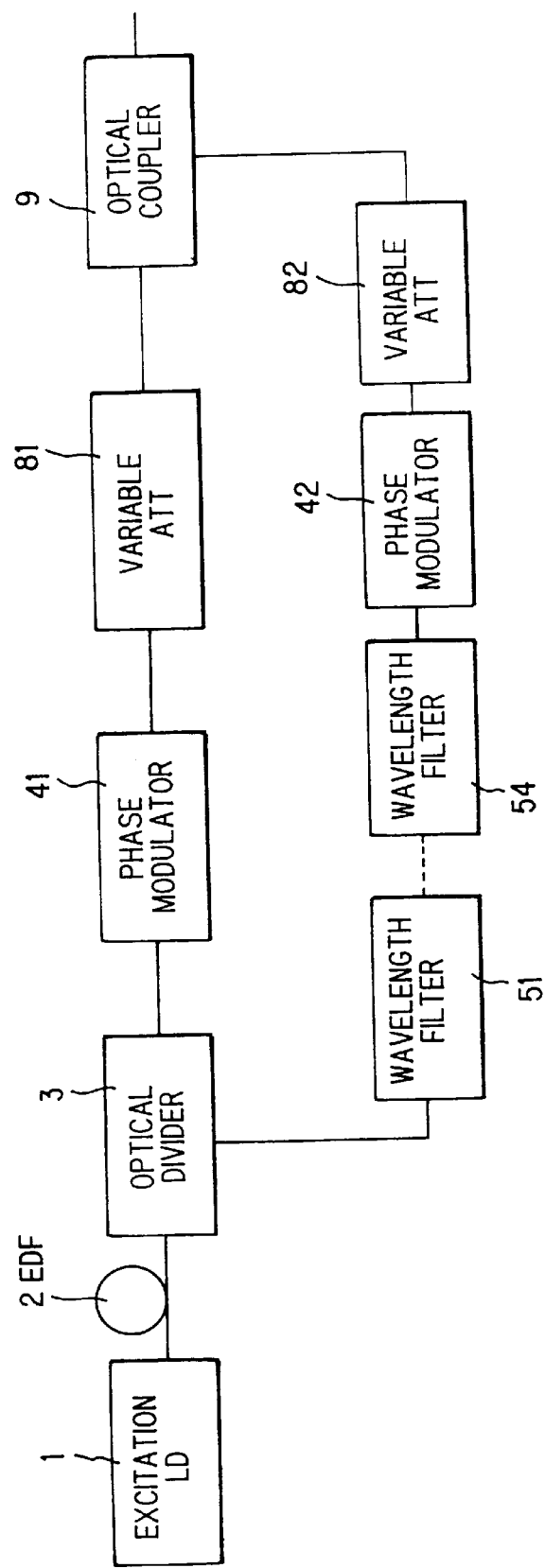
FIG. 9 is a block diagram showing a light source for wavelength division multiplexing communications in a sixth preferred embodiment according to the invention.

A light source for wavelength division multiplexing communications in the sixth preferred embodiment will be more specifically explained in FIG. 9.

The excitation laser diode (LD) 1 uses an excitation wavelength of 1.48 $\mu$m band, and Al co-doped EDF is used as the erbium-doped fiber (EDF) 2. A 3 dB fiber fused coupler is use as the optical divider 3. Fiber gratings are used as the wavelength filters 51 to 54, which have blocking wavelengths of 1545, 1548, 1551 and 1554 nm, respectively. The insertion loss of each of the fiber gratings is 15 dB at the blocking wavelength and is 0.1 dB at the other wavelengths. The phase modulators 41, 42 are of lithium niobate into which titanium is thermally diffused. The insertion loss of both the phase modulators 41, 42 is 3 dB. The variable ATTs 81, 82 are of fiber type, and the insertion loss of the variable ATT 81 is set to be 0.4 dB greater than that of the variable ATT 82.

Figure 10:
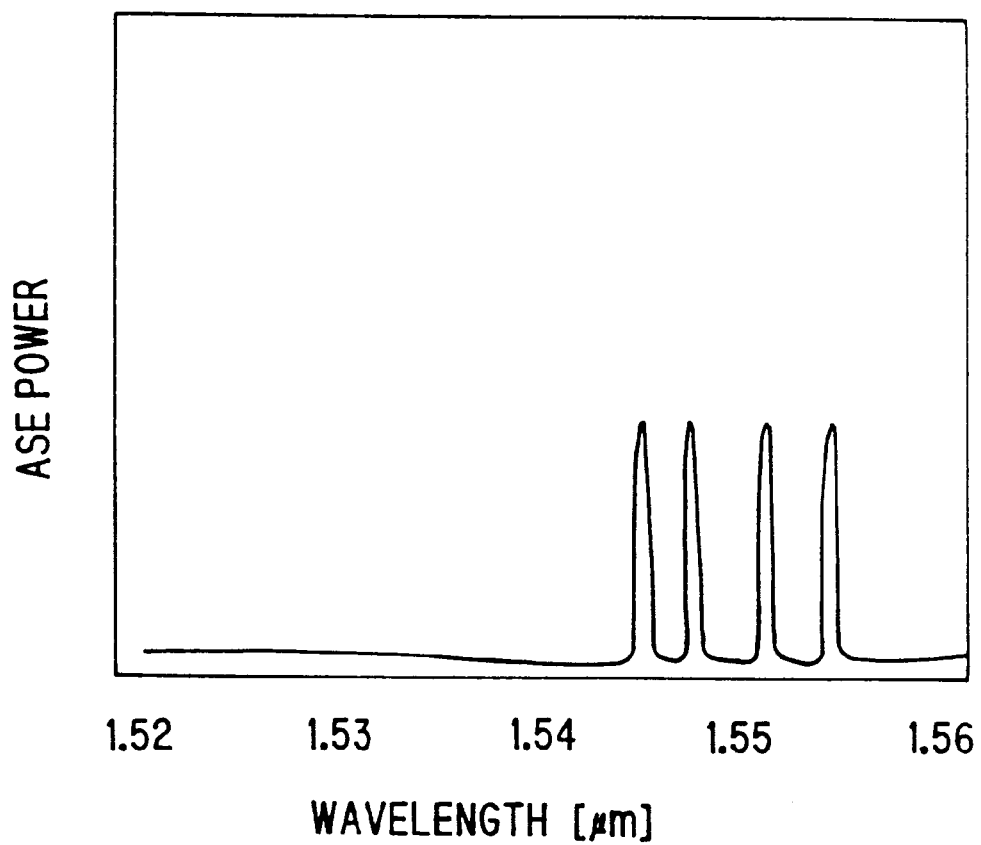
FIG. 10 is a graph showing the spectrum of signal light of an optical amplifying device using a light source for wavelength division multiplexing communications according to the invention.

In this composition, a four-wavelength output shown in FIG. 10 can be obtained by adjusting the control voltages to the phase modulators 41, 42 while monitoring the output spectra. The insertion loss of this composition is calculated by summing those of the wavelength filters and the phase modulators. In this embodiment, it is 3.4 dB. Thus, the insertion loss can be significantly reduced comparing with the conventional case using, in particular, AWG.

Further, the wavelength filters can be provided with a blocking wavelength in a wide wavelength range. Therefore, it is easy to select an arbitrary wavelength.

Though, in the above embodiments, the fiber gratings are used as the wavelength filters, the wavelength filter may be of another wavelength-blocking type filter, e.g., a filter using waveguide or dielectric multilayer film. When the invention is applied to a light source for wavelength division multiplexing communications, a plurality of wavelength filters can be used. Otherwise, by using the composition with a single wavelength filter, unnecessary light can be completely removed by that composition. Thus, it can be also used as a light source for optical communications that serves to reduce the effect caused by wavelength diffusion.

As the phase modulators, other than a device using electro-optic effect, a waveguide type phase modulator using thermo-optic effect or a phase generator that uses a bulk type optical element, such as a prism, to physically change an optical path length may be used.

Further, EDF with back excitation can bring the same result.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A light source for wavelength division multiplexing communications, comprising:

means for outputting light with a wavelength band having a constant width;

means for dividing said light into first divided light and second divided light;

at least one selective wavelength blocking means which blocks selectively light with a specific wavelength of said first divided light to output light that said light with a specific wavelength is removed;

means for conducting such a phase control that the phase difference between said selectively-wavelength-blocked light and said second divided light is 180° to each other and for outputting first phase-controlled light and second phase-controlled light; and means for coupling said first phase-controlled light and said second phase-controlled light to output coupled light.

2. A light source for wavelength division multiplexing communications, according to claim 1, wherein:

a plurality of said selective wavelength blocking means with specific wavelengths different from each other are in series disposed.

3. A light source for wavelength division multiplexing communications, according to claim 1, wherein:

said light outputting means is an optical fiber amplifier that comprises an optical fiber with core part that rare earth element is doped, an excitation light source which outputs excitation light, and an optical coupler which couples said excitation light into one end of said optical fiber.

4. A light source for wavelength division multiplexing communications, according to claim 2, wherein:

said light outputting means is an optical fiber amplifier that comprises an optical fiber with core part that rare earth element is doped, an excitation light source which outputs excitation light, and an optical coupler which couples said excitation light into one end of said optical fiber.

5. A light source for wavelength division multiplexing communications, according to claim 1, further comprising:

means for controlling to equalize the output levels of said first phase-controlled light and said second phase-controlled light, said light output controlling means being located between said light dividing means and said light coupling means.

6. A light source for wavelength division multiplexing communications, according to claim 2, further comprising:

means for controlling to equalize the output levels of said first phase-controlled light and said second phase-controlled light, said light output controlling means being located between said light dividing means and said light coupling means.

7. A light source for wavelength division multiplexing communications, according to claim 3, further comprising:

means for controlling to equalize the output levels of said first phase-controlled light and said second phase-controlled light, said light output controlling means being located between said light dividing means and said light coupling means.

8. A light source for wavelength division multiplexing communications, according to claim 1, wherein, said phase controlling means comprises:

a first phase controller which controls the phase of said light that said light with a specific wavelength is removed to output said first phase-controlled light;

a second phase controller which controls the phase of said second divided light to output said second phase-controlled light; and a phase control circuit which controls said first and second phase controllers so that the phase difference between said first phase-controlled light and said second phase-controlled light is 180° to each other.

9. A light source for wavelength division multiplexing communications, according to claim 2, wherein, said phase controlling means comprises:

a first phase controller which controls the phase of said light that said light with a specific wavelength is removed to output said first phase-controlled light;

a second phase controller which controls the phase of said second divided light to output said second phase-controlled light; and a phase control circuit which controls said first and second phase controllers so that the phase difference between said first phase-controlled light and said second phase-controlled light is 180° to each other.

10. A light source for wavelength division multiplexing communications, according to claim 3, wherein, said phase controlling means comprises:

a first phase controller which controls the phase of said light that said light with a specific wavelength is removed to output said first phase-controlled light;

a second phase controller which controls the phase of said second divided light to output said second phase-controlled light; and a phase control circuit which controls said first and second phase controllers so that the phase difference between said first phase-controlled light and said second phase-controlled light is 180° to each other.

11. A light source for wavelength division multiplexing communications, according to claim 5, wherein, said phase controlling means comprises:

a first phase controller which controls the phase of said light that said light with a specific wavelength is removed to output said first phase-controlled light;

a second phase controller which controls the phase of said second divided light to output said second phase-controlled light; and a phase control circuit which controls said first and second phase controllers so that the phase difference between said first phase-controlled light and said second phase-controlled light is 180° to each other.

12. A light source for wavelength division multiplexing communications, according to claim 1, further comprising:

means for controlling constantly the polarization state of light to be input to said phase controlling means, said polarization controlling means being located before said phase controlling means.

13. A light source for wavelength division multiplexing communications, according to claim 2, further comprising:

means for controlling constantly the polarization state of light to be input to said phase controlling means, said polarization controlling means being located before said phase controlling means.

14. A light source for wavelength division multiplexing communications, according to claim 3, further comprising:

means for controlling constantly the polarization state of light to be input to said phase controlling means, said polarization controlling means being located before said phase controlling means.

15. A light source for wavelength division multiplexing communications, according to claim 5, further comprising:

means for controlling constantly the polarization state of light to be input to said phase controlling means, said polarization controlling means being located before said phase controlling means.

16. A light source for wavelength division multiplexing communications, according to claim 8, further comprising:

means for controlling constantly the polarization state of light to be input to said phase controlling means, said polarization controlling means being located before said phase controlling means.

17. A light source for wavelength division multiplexing communications, according to claim 1, wherein:

said selective wavelength blocking means includes a wavelength filter composed of dielectric multilayer film.

18. A light source for wavelength division multiplexing communications, according to claim 2, wherein:

said selective wavelength blocking means includes a wavelength filter composed of dielectric multilayer film.

19. A light source for wavelength division multiplexing communications, according to claim 3, wherein:

said selective wavelength blocking means includes a wavelength filter composed of dielectric multilayer film.

20. A light source for wavelength division multiplexing communications, according to claim 5, wherein:

said selective wavelength blocking means includes a wavelength filter composed of dielectric multilayer film.

21. A light source for wavelength division multiplexing communications, according to claim 8, wherein:

said selective wavelength blocking means includes a wavelength filter composed of dielectric multilayer film.

22. A light source for wavelength division multiplexing communications, according to claim 12, wherein:

said selective wavelength blocking means includes a wavelength filter composed of dielectric multilayer film.

23. A light source for wavelength division multiplexing communications, according to claim 1, wherein:

said selective wavelength blocking means includes a wavelength filter composed of an optical waveguide.

24. A light source for wavelength division multiplexing communications, according to claim 2, wherein:

said selective wavelength blocking means includes a wavelength filter composed of an optical waveguide.

25. A light source for wavelength division multiplexing communications, according to claim 3, wherein:

said selective wavelength blocking means includes a wavelength filter composed of an optical waveguide.

26. A light source for wavelength division multiplexing communications, according to claim 5, wherein:

said selective wavelength blocking means includes a wavelength filter composed of an optical waveguide.

27. A light source for wavelength division multiplexing communications, according to claim 8, wherein:

said selective wavelength blocking means includes a wavelength filter composed of an optical waveguide.

28. A light source for wavelength division multiplexing communications, according to claim 12, wherein:

said selective wavelength blocking means includes a wavelength filter composed of an optical waveguide.

29. A light source for wavelength division multiplexing communications, according to claim 1, wherein:

said selective wavelength blocking means includes a fiber grating.

30. A light source for wavelength division multiplexing communications, according to claim 2, wherein:

said selective wavelength blocking means includes a fiber grating.

31. A light source for wavelength division multiplexing communications, according to claim 3, wherein:

said selective wavelength blocking means includes a fiber grating.

32. A light source for wavelength division multiplexing communications, according to claim 5, wherein:

said selective wavelength blocking means includes a fiber grating.

33. A light source for wavelength division multiplexing communications, according to claim 8, wherein:

said selective wavelength blocking means includes a fiber grating.

34. A light source for wavelength division multiplexing communications, according to claim 12, wherein:

said selective wavelength blocking means includes a fiber grating.

35. A light source for wavelength division multiplexing communications, according to claim 1, wherein:

said phase controlling means is a waveguide type optical phase modulator that includes a substrate provided with electro-optic effect.

36. A light source for wavelength division multiplexing communications, according to claim 2, wherein:

said phase controlling means is a waveguide type optical phase modulator that includes a substrate provided with electro-optic effect.

37. A light source for wavelength division multiplexing communications, according to claim 3, wherein:

said phase controlling means is a waveguide type optical phase modulator that includes a substrate provided with electro-optic effect.

38. A light source for wavelength division multiplexing communications, according to claim 5, wherein:

said phase controlling means is a waveguide type optical phase modulator that includes a substrate provided with electro-optic effect.

39. A light source for wavelength division multiplexing communications, according to claim 8, wherein:

said phase controlling means is a waveguide type optical phase modulator that includes a substrate provided with electro-optic effect.

40. A light source for wavelength division multiplexing communications, according to claim 12, wherein:

said phase controlling means is a waveguide type optical phase modulator that includes a substrate provided with electro-optic effect.

41. A light source for wavelength division multiplexing communications, according to claim 1, wherein:

said phase controlling means is a waveguide type optical phase modulator that includes a substrate provided with thermo-optic effect.

42. A light source for wavelength division multiplexing communications, according to claim 2, wherein:

said phase controlling means is a waveguide type optical phase modulator that includes a substrate provided with thermo-optic effect.

43. A light source for wavelength division multiplexing communications, according to claim 3, wherein:

said phase controlling means is a waveguide type optical phase modulator that includes a substrate provided with thermo-optic effect.

44. A light source for wavelength division multiplexing communications, according to claim 5, wherein:

said phase controlling means is a waveguide type optical phase modulator that includes a substrate provided with thermo-optic effect.

45. A light source for wavelength division multiplexing communications, according to claim 8, wherein:

said phase controlling means is a waveguide type optical phase modulator that includes a substrate provided with thermo-optic effect.

46. A light source for wavelength division multiplexing communications, according to claim 12, wherein:

said phase controlling means is a waveguide type optical phase modulator that includes a substrate provided with thermo-optic effect.

47. A light source, for wavelength division multiplexing communications, according to claim 1, wherein:

said phase controlling means includes means for physically changing the optical path length of said second divided light.

48. A light source for wavelength division multiplexing communications, according to claim 2, wherein:

said phase controlling means includes means for physically changing the optical path length of said second divided light.

49. A light source for wavelength division multiplexing communications, according to claim 3, wherein:

said phase controlling means includes means for physically changing the optical path length of said second divided light.

50. A light source for wavelength division multiplexing communications, according to claim 5, wherein:

said phase controlling means includes means for physically changing the optical path length of said second divided light.

51. A light source for wavelength division multiplexing communications, according to claim 8, wherein:

said phase controlling means includes means for physically changing the optical path length of said second divided light.

52. A light source for wavelength division multiplexing communications, according to claim 12, wherein:

said phase controlling means includes means for physically changing the optical path length of said second divided light.

* * * * *